(12) United States Patent
Makii

(10) Patent No.: US 7,453,513 B2
(45) Date of Patent: Nov. 18, 2008

(54) LENS BARREL AND IMAGE PICKUP APPARATUS

(75) Inventor: Tatsuo Makii, Tokyo (JP)

(73) Assignee: Sony Corporation (JP)

( * ) Notice: Subject to any disclaimer, the term of this patent is extended or adjusted under 35 U.S.C. 154(b) by 720 days.

(21) Appl. No.: 10/965,294

(22) Filed: Oct. 14, 2004

(65) Prior Publication Data
US 2005/0104996 A1    May 19, 2005

(30) Foreign Application Priority Data
Oct. 31, 2003   (JP) ............................ P2003-372929

(51) Int. Cl.
H04N 5/225 (2006.01)
H04N 5/262 (2006.01)

(52) U.S. Cl. .................. 348/360; 348/240.3; 396/75

(58) Field of Classification Search ............ 396/71–78; 359/694; 348/360, 373, 240.3
See application file for complete search history.

(56) References Cited

U.S. PATENT DOCUMENTS

| | | | |
|---|---|---|---|
| 5,150,260 A | 9/1992 | Chigira | 359/694 |
| 5,737,644 A | 4/1998 | Nomura et al. | 396/72 |
| 5,821,531 A | 10/1998 | Nomura et al. | 250/231.13 |
| 6,473,567 B1 * | 10/2002 | Nakashima | 396/75 |
| 2001/0053285 A1 | 12/2001 | Ichinokawa | 396/144 |
| 2002/0149859 A1 * | 10/2002 | Muto et al. | 359/694 |

FOREIGN PATENT DOCUMENTS

GB     2309543     7/1997

* cited by examiner

*Primary Examiner*—Lin Ye
*Assistant Examiner*—Trung Diep
(74) *Attorney, Agent, or Firm*—Lerner, David, Littenberg, Krumholz & Mentlik, LLP (57) ABSTRACT

A lens barrel includes an image-capturing optical system having a movable lens and a drive mechanism with a screw member extending along the optical axis direction and being rotated by a motor, a female threaded member moving along the screw member as it revolves. The screw member includes a male screw, and a shaft having an outside diameter equal or less than an inside diameter of a female threaded member, the shaft extending from an end of the male screw, the end being at an opposite direction to a direction in which the engagement section is in abutment with the end of the female threaded member. The female threaded member is disposed such that the female threaded member can move along the male screw and can move from the male screw to a spot on the shaft in abutment with the male screw.

8 Claims, 12 Drawing Sheets

LENS BARREL AND IMAGE PICKUP APPARATUS

CROSS REFERENCES TO RELATED APPLICATIONS

The present invention claims priority to its priority document No. 2003-372929 filed in the Japanese Patent Office on Oct. 31, 2003, the entire contents of which being incorporated by reference herein.

BACKGROUND OF THE INVENTION

1. Field of the Invention

The present invention relates to a lens barrel and an image pickup apparatus.

2. Description of Related Art

In recent years, there are many products using a lens barrel of a collapsible type in which an image-capturing optical system is integrated inside a barrel in order to achieve smaller sizes in image pickup apparatuses such as digital still cameras and digital video cameras.

Such a lens barrel has a movable lens, which is movably disposed along its optical axis direction, at a position in front of an imaging device that picks up an image of an object formed by the image-capturing optical system, a guide mechanism that guides the movable lens in the optical axis direction, and a drive mechanism that moves the movable lens in the optical axis direction (for example, see Japanese Patent Application Publication No. 2002-296480).

The lens barrel is put into a collapsible barrel mode by positioning the movable lens to a limit position in a back side toward the imaging device. Positioning of the movable lens to the limit position is performed by attaching a detection piece to the movable lens, providing a sensor such as a photo interrupter detecting the detection piece attached to a part of the barrel so that the sensor detects the detection piece when the movable lens is positioned at the limit position, and controlling the drive mechanism based on a detection signal from the sensor.

SUMMARY OF THE INVENTION

However, in the lens barrel of related art, when the movable lens is positioned in the limit position, it is necessary to secure a preset margin between the movable lens and the lens barrel portion to prevent a collision between these two parts because it is expected to have some variance of accuracy when attaching a sensor to the lens barrel part as well as variance of accuracy of a stop position of the movable lens due to a change of a moving rate of the movable lens by means of the drive mechanism (for example, variance arising from an overrun of the movable lens and the like). Such a requirement of the margin becomes a disadvantage in making dimensions of the lens barrel smaller when the barrel of the lens barrel is recessed in the optical axis direction.

The present invention is made in view of such circumstances. It is desirable to provide a lens barrel and/or an image pickup apparatus, which have advantageous configuration in making dimensions of the lens barrel smaller at the time of recessing the lens barrel.

According to one embodiment of the present invention, there is provided a lens barrel including; an image-capturing optical system disposed inside a barrel. The image-capturing optical system includes a movable lens disposed movably in an optical axis direction thereof, and a drive mechanism moving the movable lens in the optical axis direction. The movable lens includes a lens and a lens frame holding the lens. The drive mechanism includes a male screw member extending along the optical axis direction, a motor revolving the male screw member, a female screw member being engaged with the male screw member while the revolution being blocked, and moving along the male screw member in response to the revolution of the male screw member, an engagement section provided on the lens frame and placed so as to face an end along the optical axis direction of the female screw member, and a forcing member to force the lens frame in a direction abutting the engagement section to the end of the female screw member. The male screw member includes a male screw to be engaged with the female screw, and a shaft having an outside diameter equal or less than an inside diameter of a female screw being included in the female screw member, the shaft extending on a same shaft of the male screw from an end of the male screw, the end being positioned at an opposite direction to a direction in which the engagement section is in abutment with the end of the female screw member. The female screw member is disposed such that the female screw member can move along the male screw of the male screw member and that the female screw member can move from the male screw to a spot on the shaft in abutment with the male screw.

According to another embodiment of the present invention, there is provided an image pickup apparatus including a lens barrel. The lens barrel includes an image-capturing optical system disposed inside a barrel. The image-capturing optical system includes a movable lens disposed movably in an optical axis direction thereof, and a drive mechanism moving the movable lens in the optical axis direction. The movable lens includes a lens and a lens frame holding the lens. The drive mechanism includes a male screw member extending along the optical axis direction, a motor revolving the male screw member, a female screw member being engaged with the male screw member while the revolution being blocked, and moving along the male screw member in response to the revolution of the male screw member, an engagement section provided on the lens frame and placed so as to face an end along the optical axis direction of the female screw member, and a forcing member to force the lens frame in a direction abutting the engagement section to the end of the female screw member. The male screw member includes a male screw to be engaged with the female screw, and a shaft having an outside diameter equal or less than an inside diameter of a female screw being included in the female screw member, the shaft extending on a same shaft of the male screw from an end of the male screw, the end being positioned at an opposite direction to a direction in which the engagement section is in abutment with the end of the female screw member. The female screw member is disposed such that the female screw member can move along the male screw of the male screw member and that the female screw member can move from the male screw to a spot on the shaft in abutment with the male screw.

According to the embodiments of the present invention, when the female screw member is positioned on the shaft's spot, the female screw of the female screw member is off the male screw and incapable of moving the female member in the optical axis direction despite continued operation of the motor, and the female screw member remains on the same shaft's spot.

Accordingly, contrary to a case of determining the limit position in the back by using a sensor, the variance of accuracy when attaching a sensor to the lens barrel portion and the variance due to a change in the speed of revolution may not occur. As a result, it is possible to reduce a spacing between the movable lens along the optical axis and the lens barrel portion as well as spacing between the movable lens and other lens groups in accordance with an amount of the variance. This provides an advantage when making dimensions smaller in the optical axis direction when the lens barrel is recessed.

BRIEF DESCRIPTION OF DRAWINGS

The above and other objects, features and advantages of the present invention will become more apparent from the following description of the presently preferred exemplary embodiment of the invention taken in conjunction with the accompanying drawings, in which:

FIG. 3 provides perspective views explaining modes of a lens barrel, FIG. 3A showing how the lens is stored when not in use or in a collapsible barrel mode, FIG. 3B showing a wide-angle mode, and FIG. 3C showing a telephoto mode;

FIG. 4 provides sectional views of a collapsible barrel lens, FIG. 4A showing a collapsible barrel mode, FIG. 4B showing a wide-angle mode, and FIG. 4C showing a telephoto mode;

DETAILED DESCRIPTION OF EMBODIMENTS

In embodiments of the present invention, the dimensions of a collapsible lens type apparatus is made smaller, for example, by providing a shaft, where a male screw is not formed, in a male screw member that is included in a drive mechanism of a movable lens.

Embodiment 1

Figure 1:
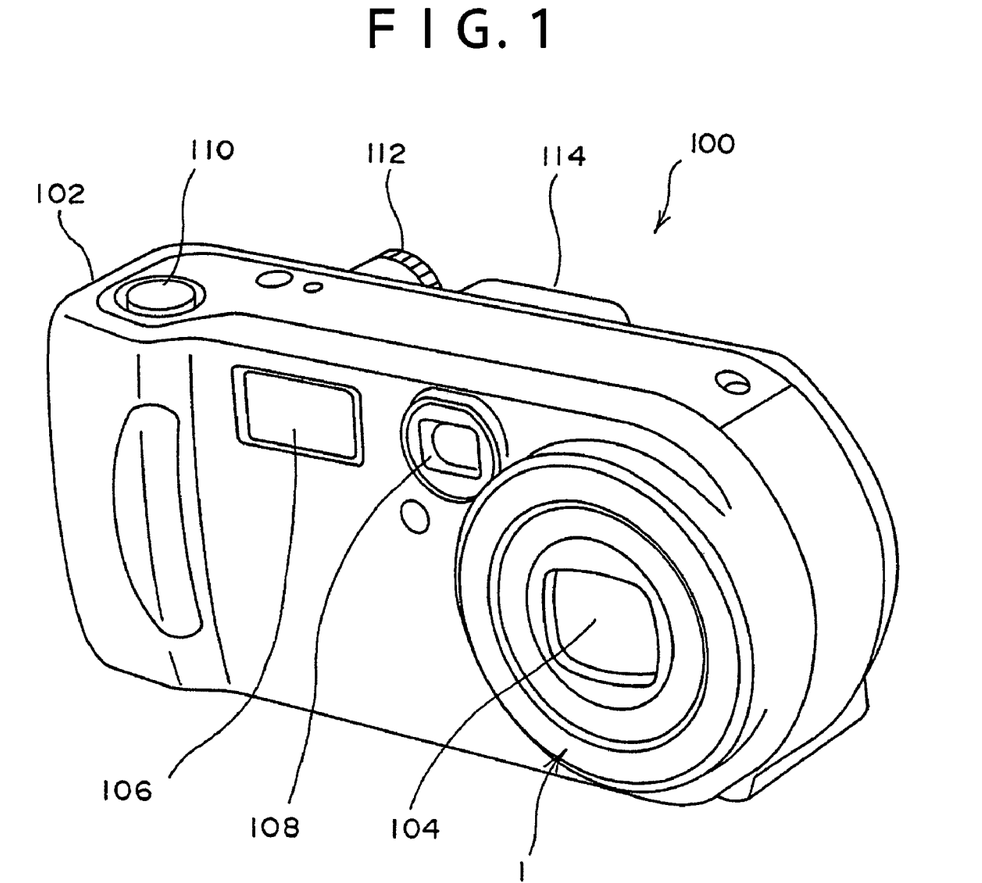
FIG. 1 is a perspective view of an image pickup apparatus of an Embodiment 1.
Figure 2:
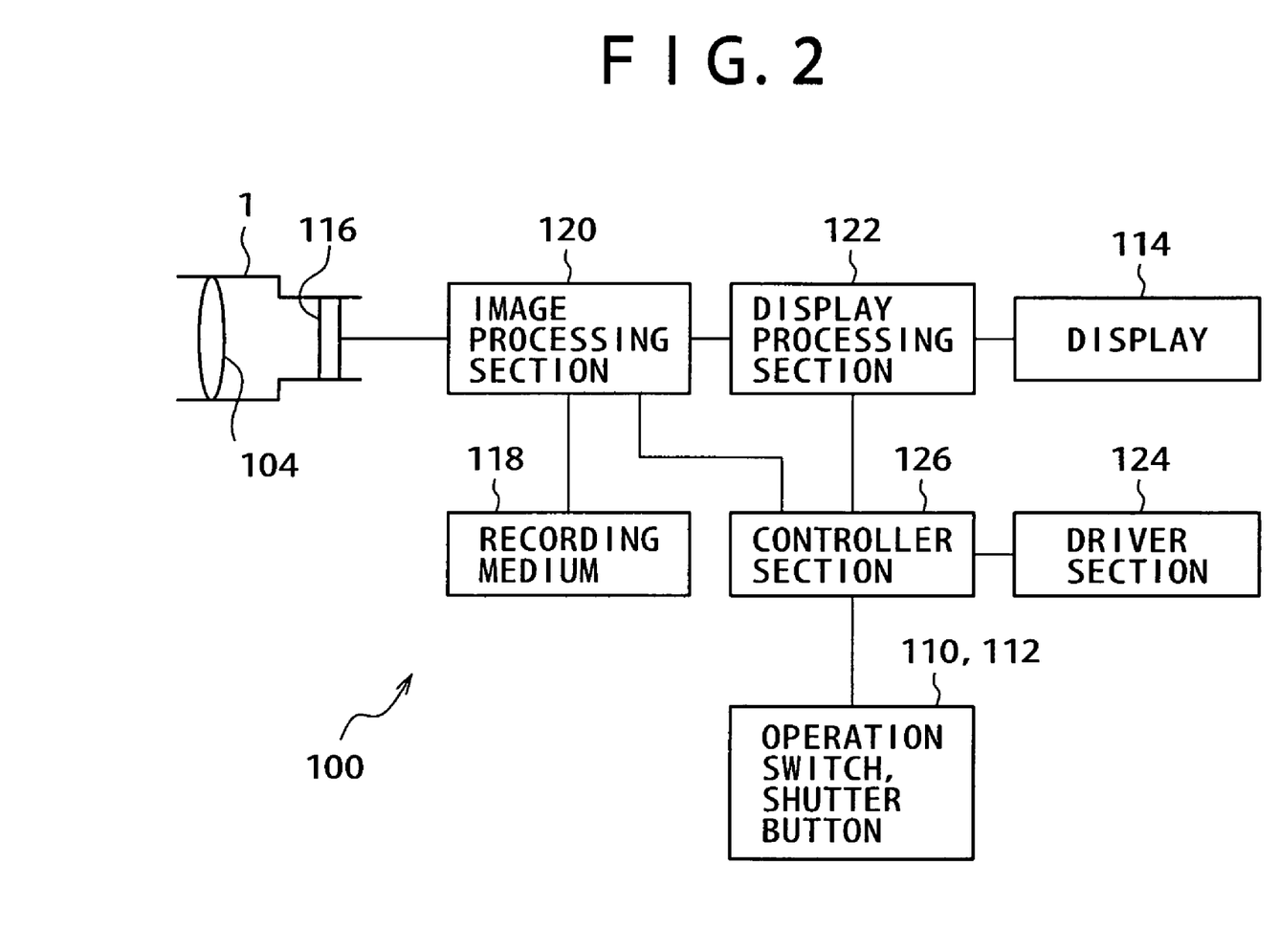
FIG. 2 is a block diagram showing a structure of an image pickup apparatus.

Next, an Embodiment 1 will be described with reference to the drawings. FIG. 1 is a perspective view of an image pickup apparatus of the Embodiment 1, and FIG. 2 is a block diagram showing a structure of an image pickup apparatus of the Embodiment 1.

As shown in FIG. 1, an image pickup apparatus 100 of the present embodiment is a digital still camera having a case 102 forming an exterior.

At a spot of an upper front right part of the case 102, there is provided a lens barrel 1 of a collapsible barrel type for storing and holding an image-capturing optical system 104, and at a spot of an upper front part of the case 102, there are provided a flash 106 for issuing a flash, an objective 108 of an optic finder, and the like. The lens barrel 1 is constructed so as to protrude and recede between a use position (wide-angle mode, telephoto mode, and an intermediate mode between the wide-angle mode and the telephoto mode) jutting out forward from the front of the case 102 and a storage position (collapsible barrel mode) to be stored in the front of the case 102 by means of a driver section 124 (FIG. 2) built in the case 102.

On an upper end surface of the case 102, there is provided a shutter button 110, and in the back surface of the case 102, there are provided a plurality of operation switches 112, a display 114 (FIG. 2) for displaying an image picked up, and others.

As shown in FIG. 2, the image pick up apparatus 100 includes an imaging device 116 that may include a CCD, a CMOS sensor or the like, which is disposed at a rear end portion of the lens barrel 1 for capturing an image of an object whose image is formed by the image-capturing optical system 104, an image processing section 120 generating imaging data based on an imaging signal outputted from the imaging device 116 and recording it in a recording medium 118 such as a memory card, a display processing section 122 that displays the imaging data on a display 114, a driver section 124, a controller section 126 including a CPU and the like for controlling the image processing section 120, the display processing section 122, and the driver section 124, and the like in response to operations made on the operation switch 112 or the shutter button 110.

Figure 3A:
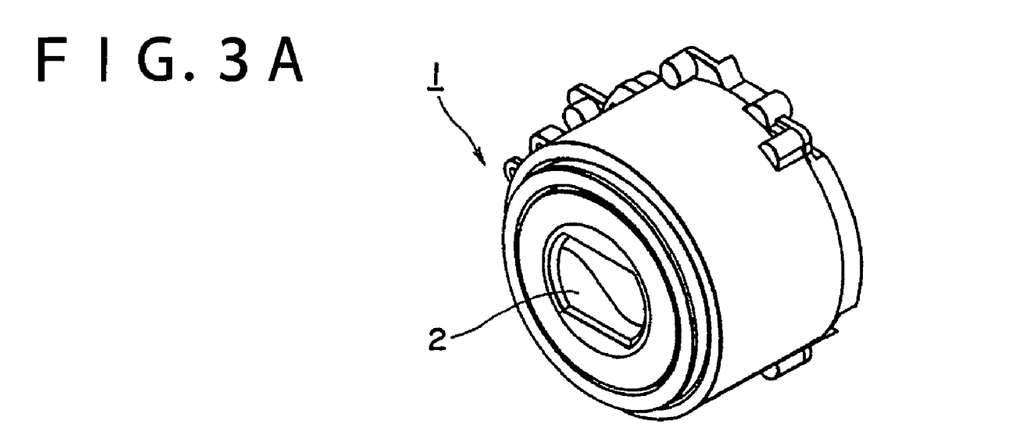
Figure 3B:
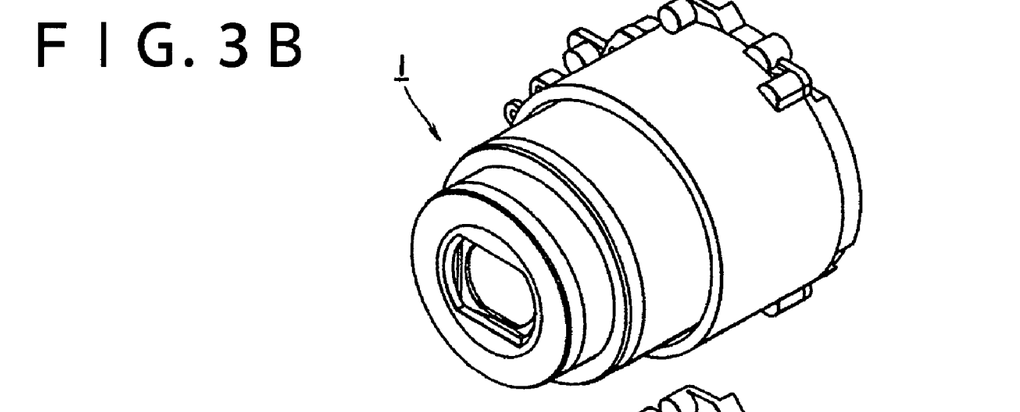
Figure 3C:
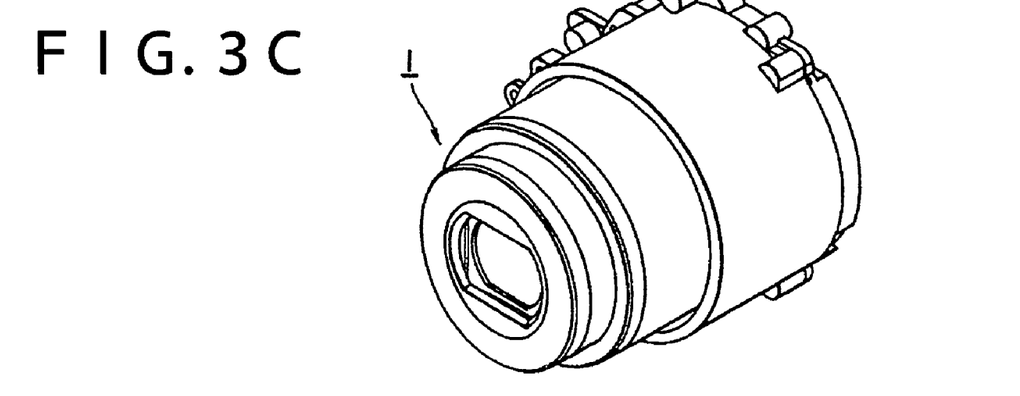
Figure 4A:
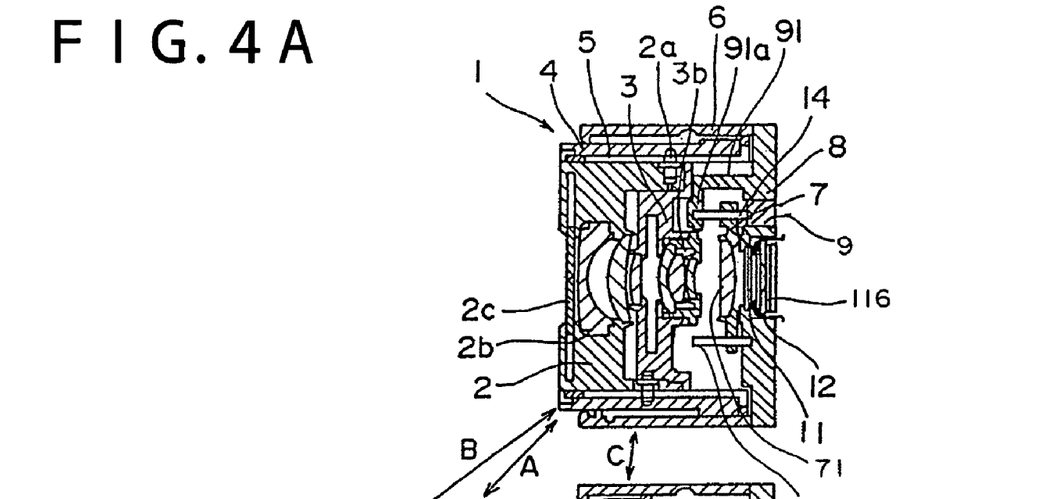
Figure 4B:
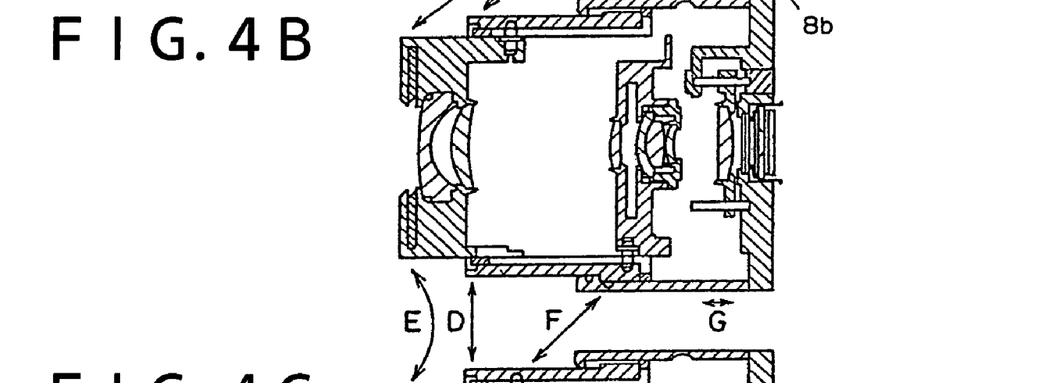
Figure 4C:
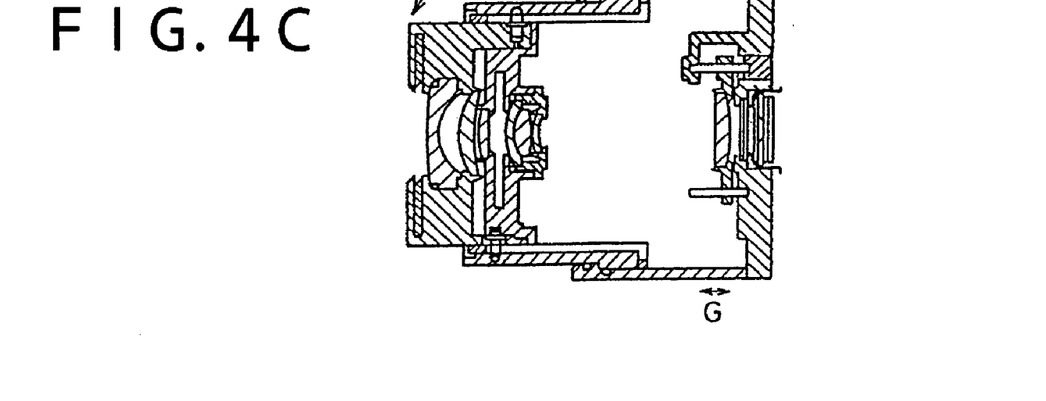
Figure 5:
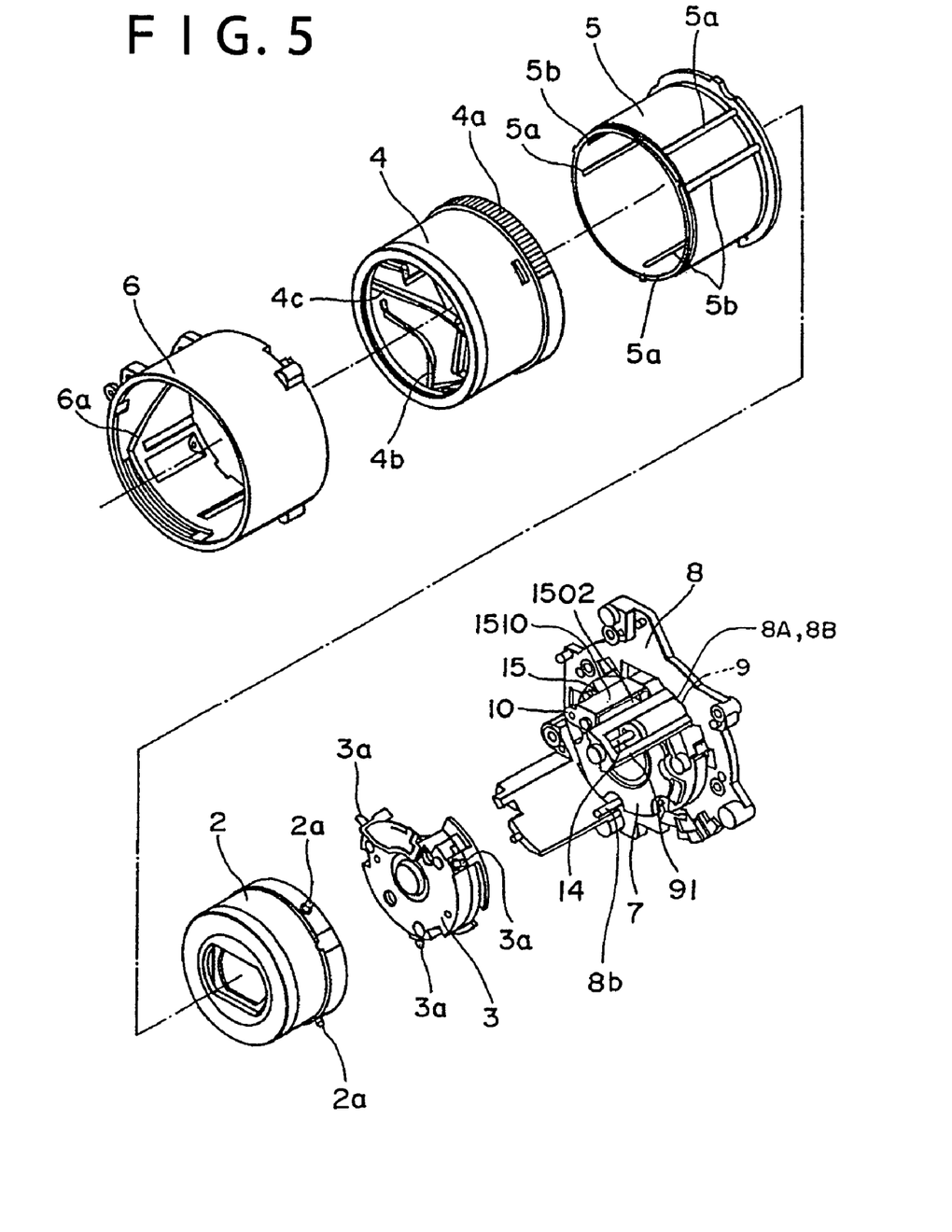
FIG. 5 is an exploded perspective view of a collapsible barrel lens.

Next, a general structure of the lens barrel 1 will be described. FIG. 3 provides perspective views to explain modes of the lens barrel 1: FIG. 3A shows when the lens is not in use and in a condition of being stored, that is, a collapsible barrel mode; FIG. 3B shows a wide-angle mode; and FIG. 3C shows a telephoto mode. FIG. 4 provides sectional views of the collapsible barrel lens: FIG. 4A shows the collapsible barrel mode; FIG. 4B shows the wide-angle mode; and FIG. 4C shows the telephoto mode. FIG. 5 is an exploded perspective view of the collapsible barrel lens.

As shown in FIG. 4, the lens barrel 1 is optically structured from three lens groups (3 Group Construction). Namely, assuming that the object side is towards the front in the optical axis direction of the lens barrel 1 and the imaging device 116 side is backward in the optical axis direction, the 3-groups, that is included in the lens barrel 1, consist of the first group, the second group, and the third group disposed from the front to the rear in this order.

The lens barrel 1 performs zooming as the first group and second group are driven in the optical axis direction along a preset cam curve, carrying out focusing, as the third group is minutely displaced in the optical axis direction. Namely, it is constructed such that a focal length is varied through displacement of the first group and the second group, while shift of a focusing position caused by this change in the focal length is corrected by displacement of the third group so as to carry out the proper focusing.

As shown in FIG. 4 and FIG. 5, a first group lens frame 2 includes three cam pins 2a (a plurality of pins) to be fitted into cam grooves 4b of a cam ring 4, a plurality of lens chambers 2b which insert and affix a plurality of lenses that is included in the first group, and a barrier mechanism 2c which protects a front lens at the time of storing and barrel-recessing.

A second group lens frame 3 includes three cam pins 3a (a plurality of pins) to be fitted into cam grooves 4c of the cam ring 4, a plurality of lens chambers 3b which insert and affix a plurality of lenses that is included in the second group. Alternatively, the second group lens frame 3 may consist of an iris shutter mechanism.

The cam ring 4 includes a gear section 4a to provide rotary drive to the cam ring 4 with an inside diameter of a fixed ring 6 as driven by a gear unit, three cam grooves 4b (a plurality of grooves) into which the cam pins 2a of the first group lens frame 2 are to be fitted, three cam grooves 4c (a plurality of grooves) into which the cam pins 3a of the second group lens frame 3 are to be fitted, and three cam pins (un-illustrated) to be fitted into cam grooves 6a of the fixed ring 6.

The cam grooves 4b and the cam grooves 4c move the first group and the second group in the optical axis direction along the preset curve and perform zooming operation.

A forward guide ring 5 is a member that moves in the optical axis direction integrally with the cam ring 4 with an inside diameter of the fixed ring 6, including a guide groove 5a that guides the first group lens frame 2 in the optical axis direction and a guide groove 5b that guides the second group lens frame 3 in the optical axis direction.

The fixed ring 6 is a member affixed to a base 8, including three cam grooves 6a (a plurality of grooves) into which the cam pins of the cam ring 4 are fitted.

The third group lens frame 7 includes a lens chamber for inserting and affixing a lens 71 that is included in the third group, and in the present embodiment, a movable lens 72 that is included in the third group lens frame 7 and the lens 71.

The movable lens 72 is guided in the optical axis direction as it is movably held in the optical axis direction to the base 8 by a guide mechanism 17 (refer to FIG. 6 and will be described later), and it is configured so as to be displaced minutely in the optical axis direction by a drive mechanism 15 (will be described later).

In the base 8, the fixed ring 6, a guide shaft stopper member 9, and a gear unit (not illustrated in the figure) are positioned and affixed.

The base 8 includes a recessed part for inserting, positioning, and affixing an optical filter 11 such as an optical low-pass cut filter and an infrared cut filter as well as a recessed part for inserting a seal rubber 12 to prevent dust particles from infiltrating the inside of the lens barrel and to provide elasticity to the optical filter 11.

The imaging device 116 is positioned and affixed to the base 8 with high accuracy.

The gear unit drives the cam ring 4 by means of a gear section 4a. A gear ratio is determined such that sufficient drive power may be obtained in a range from the collapsible barrel→wide-angle→telephoto and telephoto→wide-angle→collapsible barrel modes. The gear unit performs zooming operation of this collapsible barrel lens by driving the cam ring 4.

Further, in the present embodiment, the image-capturing optical system of the present embodiment is configured by the plurality of lenses held in the first group lens frame 2, the second group lens frame 3, and the third group lens frame 7.

Still further, in the present embodiment, the first group lens frame 2, the second group lens frame 3, the cam ring 4, the forward guide ring 5, the fixed ring 6, the third group lens frame 7, and the base 8 are formed of fiber reinforced plastics, for example, polycarbonate resin (black color) containing glass fiber, having strength, light shielding property, and making mass production easier.

Next, lens operation by the cam ring 4 will be described.

In the operation between the collapsible barrel and the wide-angle mode, the cam ring 4 is driven as the gear section 4a is given driving power through the gear unit, so that the cam pin moves towards the object side in the optical axis direction while revolving along the cam grooves 6a of the fixed ring 6. At this time, the forward guide ring 5 moves integrally with the cam ring 4 (refer to arrow A in FIG. 4).

At this time, the first group lens frame 2 moves such that the cam pin 2a moves by the preset curve along the cam grooves 4b and the guide groove 5a (refer to arrow B in FIG. 4). At this time, the second group lens frame 3 moves such that the cam pin 3a moves by the preset curve along the cam grooves 4c and the guide groove 5b (refer to arrow C in FIG. 4). From the operation described above, the first group and the second group move to preset optical positions, i.e., the wide-angle position.

In the operation between the wide-angle mode and the telephoto mode, the cam ring 4 is also driven as the gear section 4a is given driving power through the gear unit, while in this range, the cam grooves 5a is formed so that the cam ring 5 will not move in the optical axis direction and the forward guide ring 5 will not move in the optical axis direction (refer to arrow D in FIG. 4).

At this time, the first group lens frame 2 moves such that the cam pin 2a moves by the preset curve along the cam grooves 4b and the guide groove 5b (refer to arrow E in FIG. 4). Furthermore, the second group lens frame 3 moves such that the cam pin 3a moves by the preset curve along the cam grooves 4c and the guide groove 5b (refer to arrow F in FIG. 4). From the above, the first group and the second group move along the preset curve, and by optically moving between the wide-angle mode and the telephoto mode, thereby the zooming operation is performed.

As to the telephoto→wide-angle→collapsible barrel modes, the operation is performed as the cam ring 4 is revolved in reverse direction by driving the gear unit in reverse to the above operation. By the cam ring 4 drive through the above gear unit, the lens barrel 1 performs the collapsible barrel operation as well as the zooming operation. However, separately from these, as the movable lens 72 is minutely displaced in the optical axis direction by means of the drive mechanism 15, the focusing operation is performed (refer to arrow G in FIG. 4).

Next, construction of the movable lens 72, the drive mechanism 15 and the guide mechanism 7 which are the principal components of an image pick up apparatus according to the present embodiment will be described.

Figure 6:
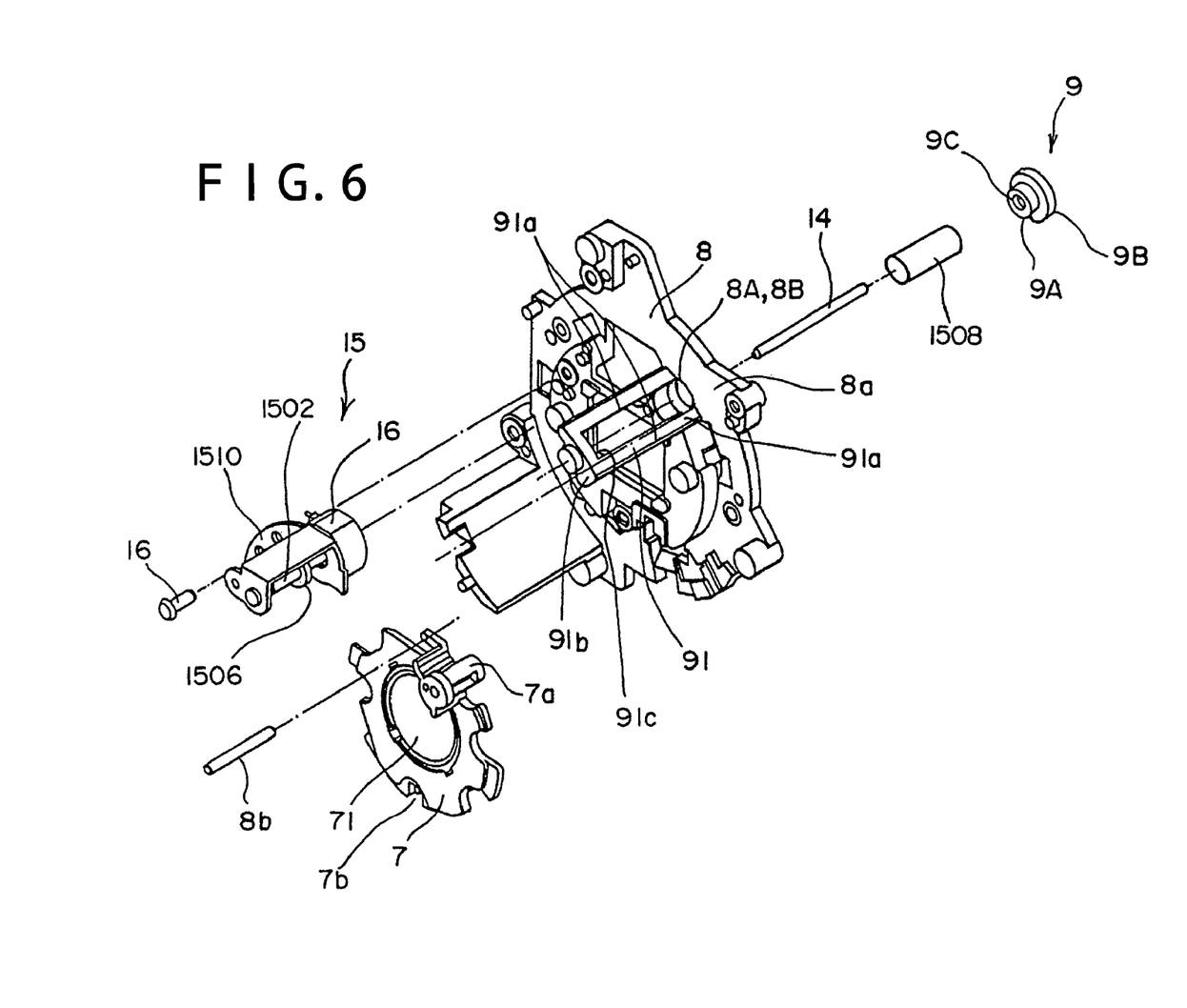
FIG. 6 is an exploded perspective view explaining the principal components of an image pickup apparatus according to an Embodiment 1.
Figure 7:
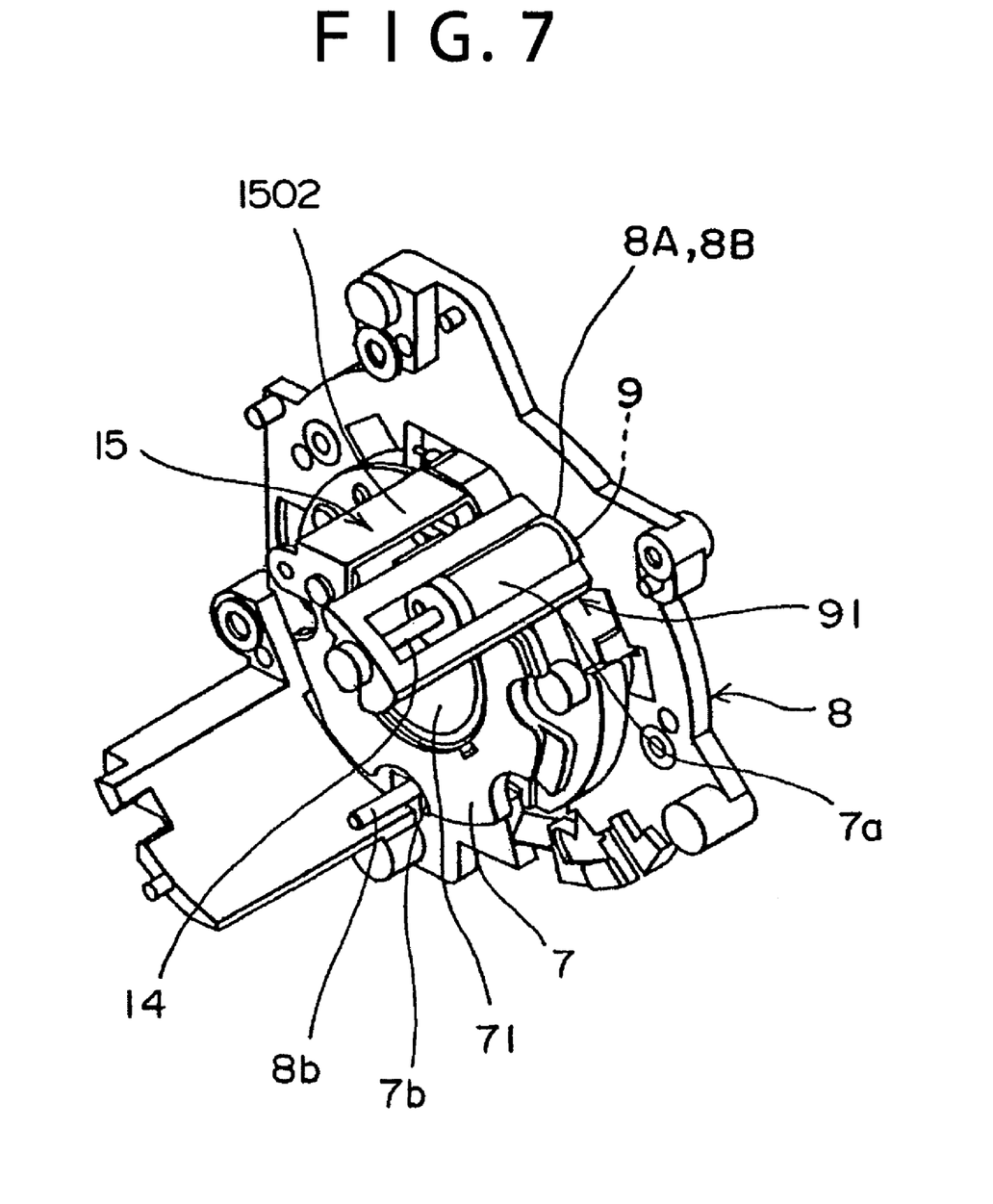
FIG. 7 is a perspective view explaining an assembly state of the principal components of an image pickup apparatus according to an Embodiment 1.
Figure 8:
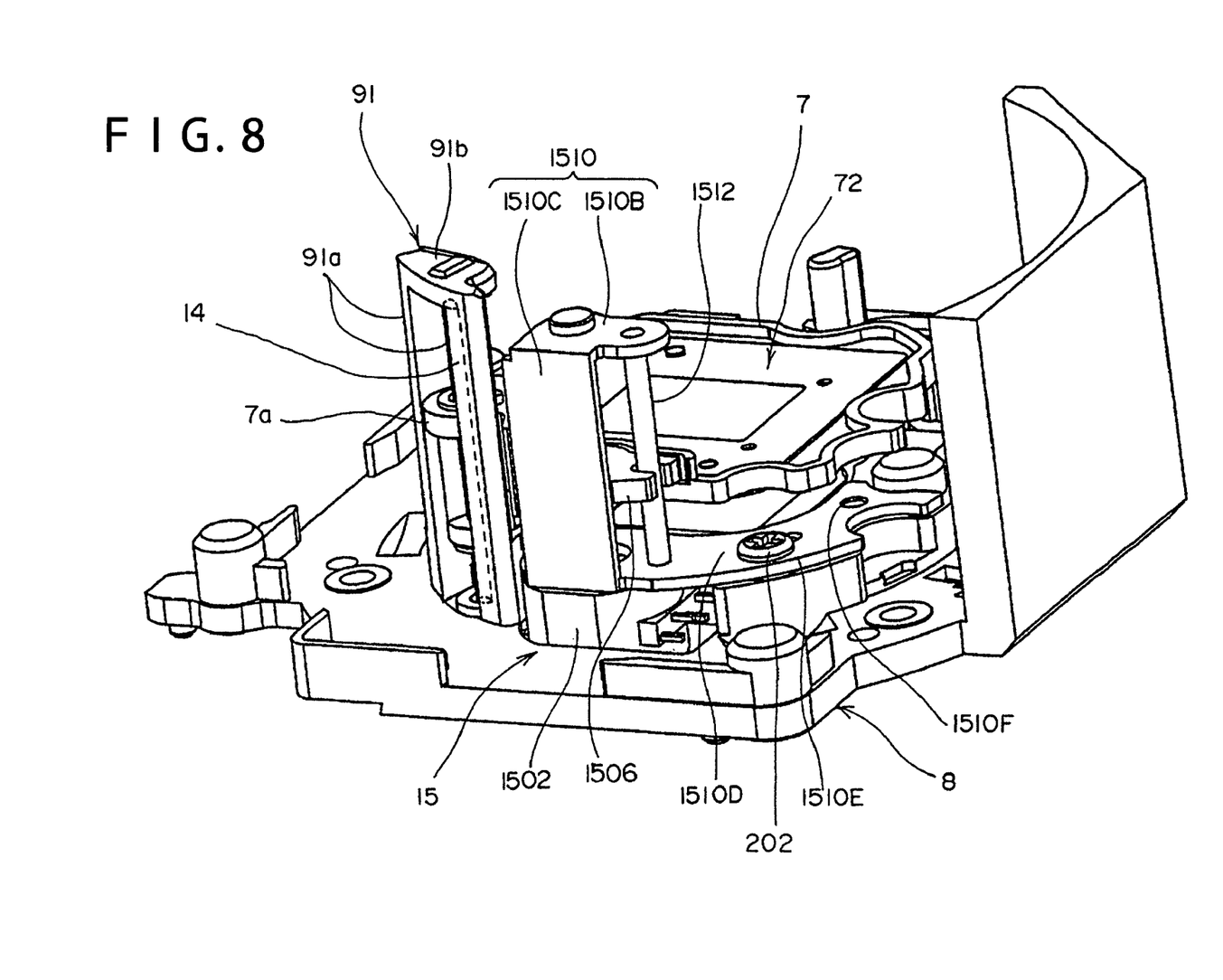
FIG. 8 is a perspective view explaining an assembly state of the principal components of an image pickup apparatus according to an Embodiment 1.
Figure 9:
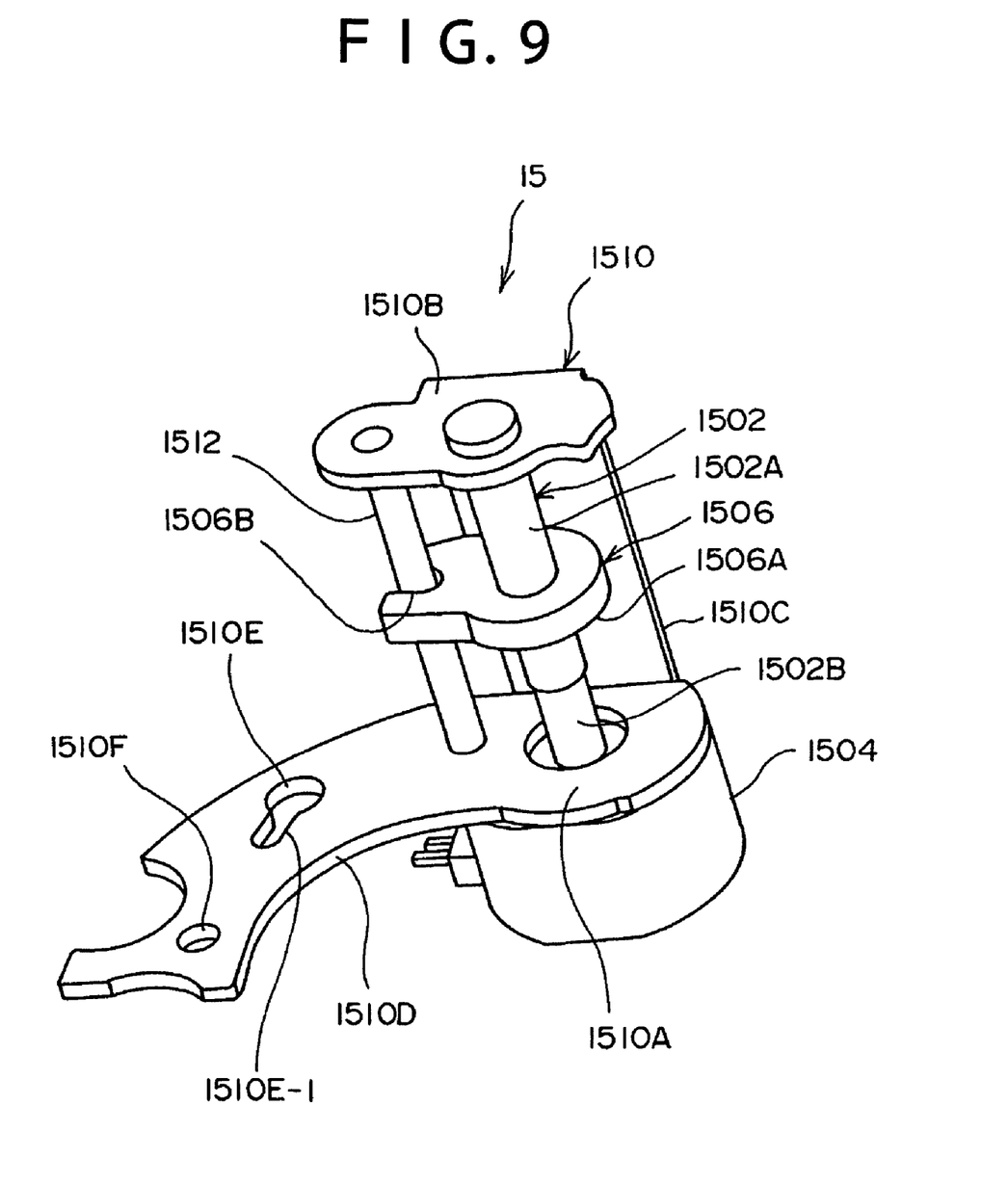
FIG. 9 is a perspective of a drive mechanism.
Figure 10:
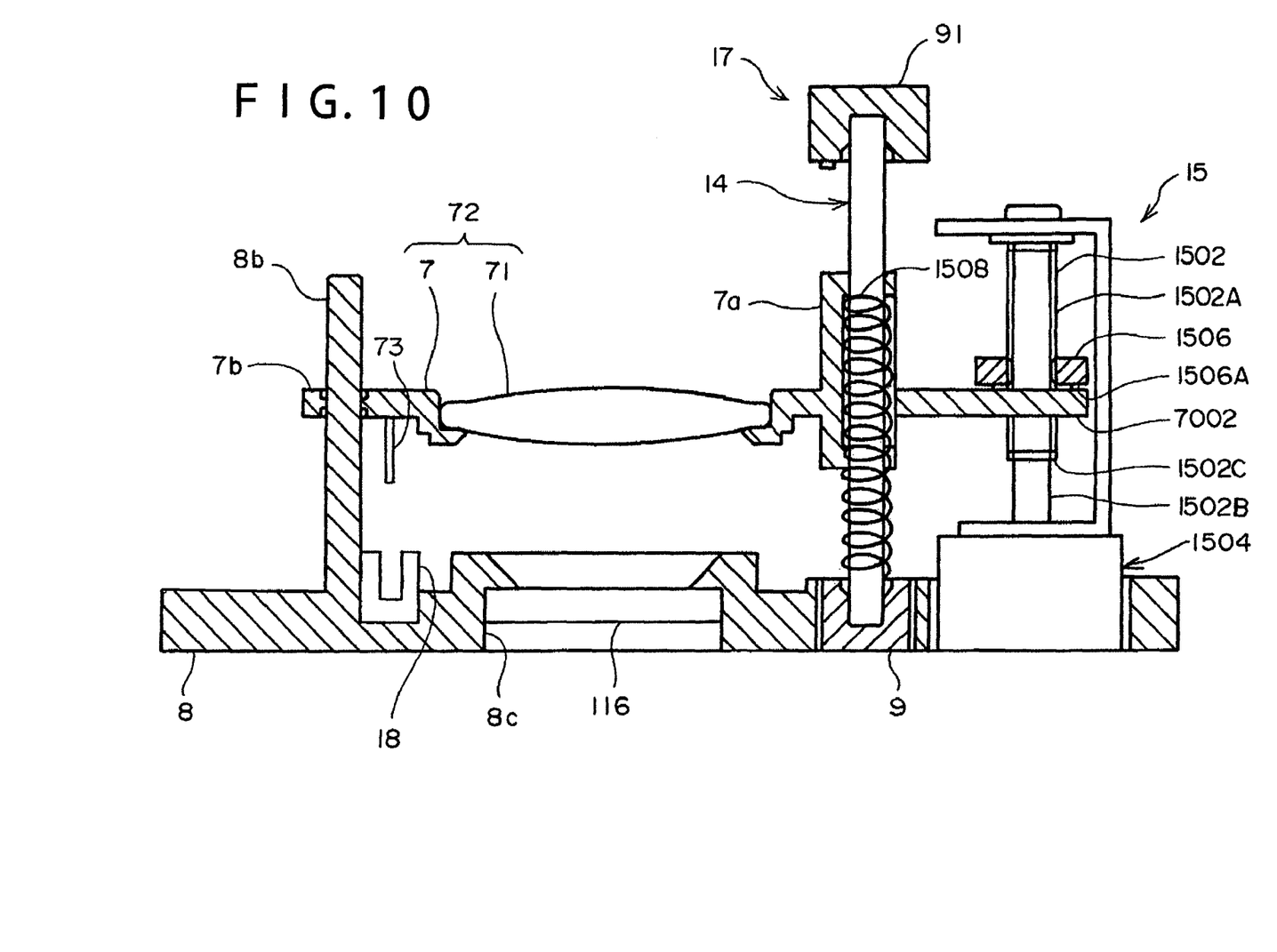
FIG. 10 is a sectional view in the vicinity of a drive mechanism showing a condition in which a third group lens frame is placed at a position ahead of a limit position.
Figure 11:
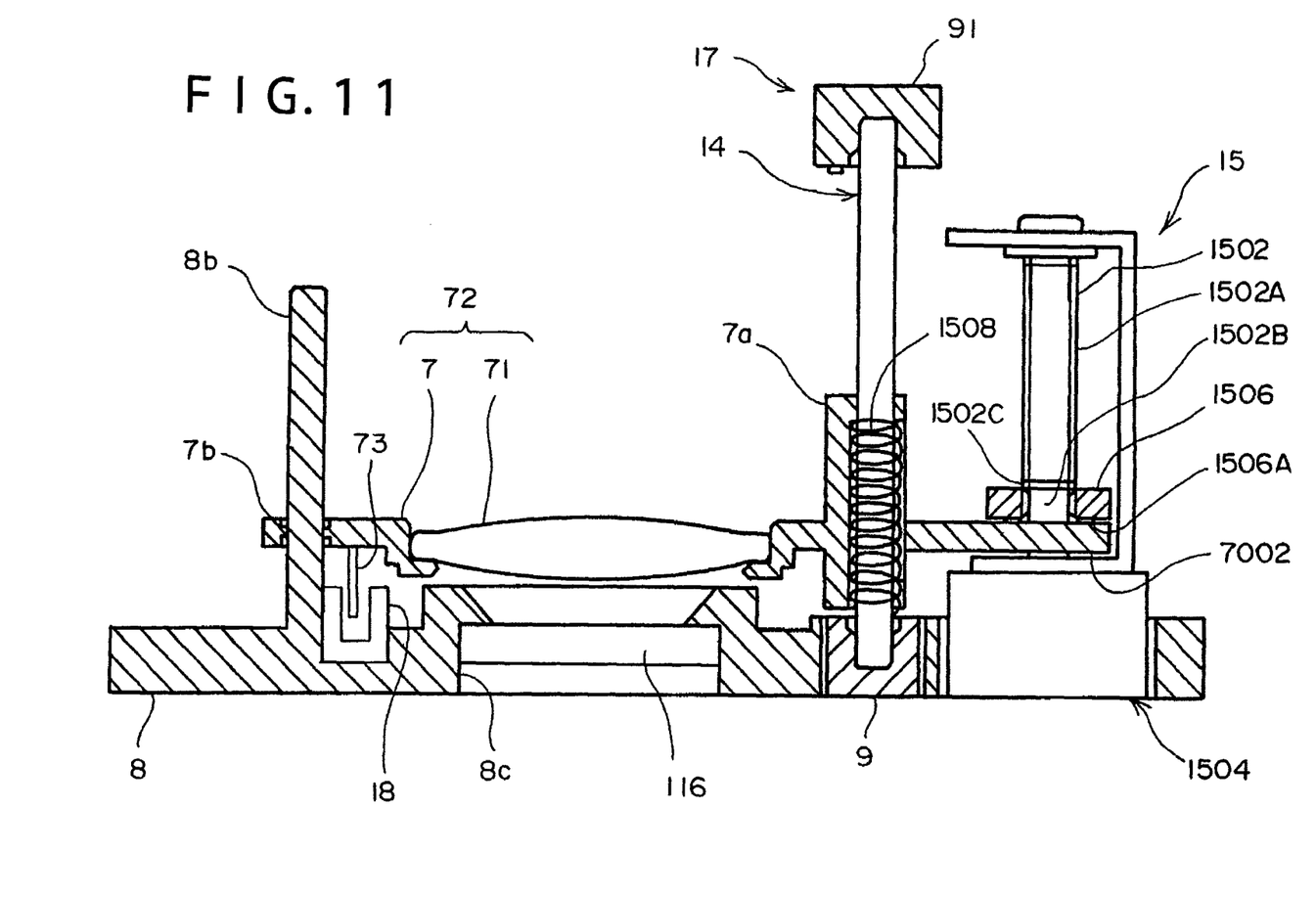
FIG. 11 is a sectional view in the vicinity of a drive mechanism showing a condition in which a third group lens frame is placed at a limit position.
Figure 12:
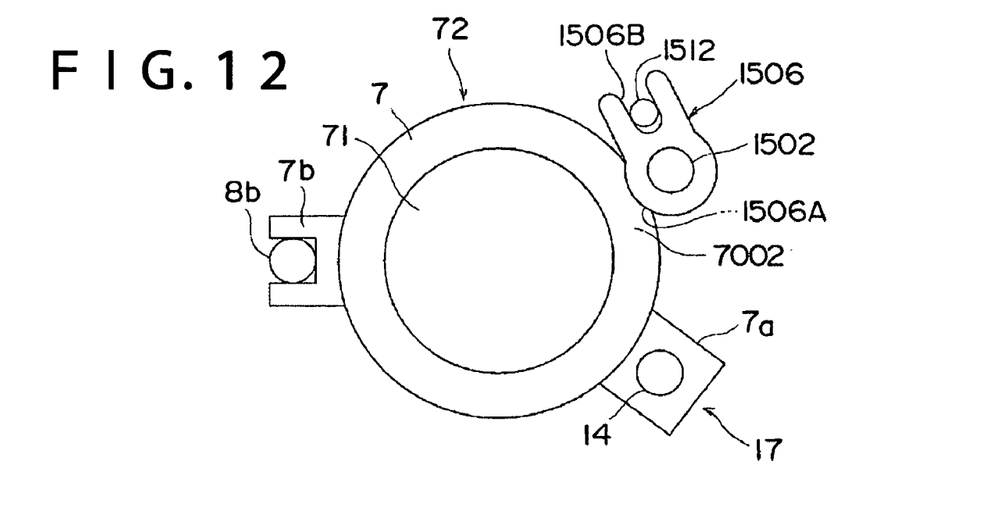
FIG. 12 is a plan view of FIG. 10 and FIG. 11.
Figure 13:
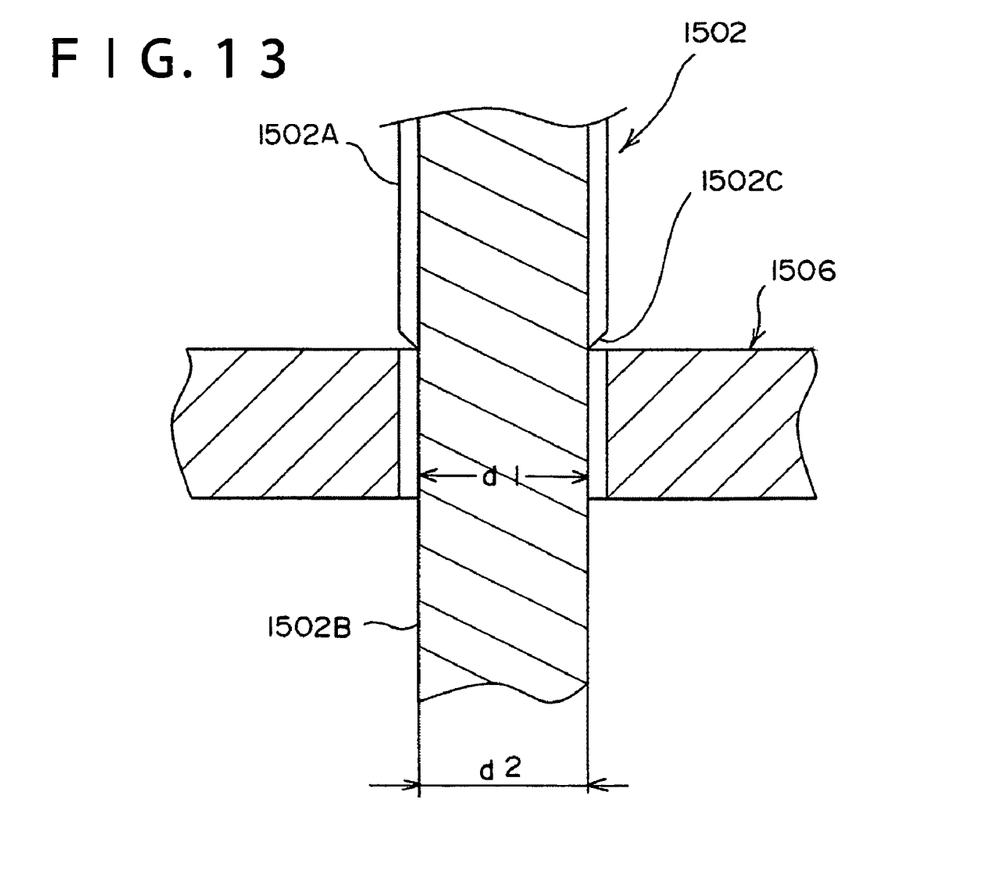
FIG. 13 is a sectional view of a male screw member and a female screw member.

FIG. 6 is an exploded perspective view explaining the principal components of an image pickup apparatus according to Embodiment 1; FIG. 7 is a perspective view explaining an assembled state of the principal components of an image pickup apparatus according to the Embodiment 1; FIG. 8 is a perspective view explaining an assembled state of the principal components of an image pickup apparatus according to the Embodiment 1; FIG. 9 is a perspective view of the drive mechanism 15; FIG. 10 is a sectional view in the vicinity of the drive mechanism 15 showing the third group lens frame placed at a front position from the limit position; FIG. 11 is a sectional view in the vicinity of the drive mechanism 15 showing the third group lens frame placed at a front position from the limit position; FIG. 12 is a plan view of FIG. 10 and FIG. 11; and FIG. 13 is a sectional view of the male screw member and the female screw member.

As shown in FIG. 6 to FIG. 8, the third group lens frame 7 is formed in a circular disk shape, with the lens 71 being held in its central opening, and a first bearing 7a and a second bearing 7b are provided at outside spots in the radial direction, with a spacing in between in the circumferential direction.

Guide shafts 14 and 8b extending along the optical axis direction are inserted through the first bearing 7a and the second bearing 7b, while the guide shafts 14 and 8b are attached to, for example, the base 8 formed in a columnar shape of a uniform outside diameter.

In the present embodiment, there is provided the guide mechanism 17 that guides the third group lens frame 7, which corresponds to the movable lens 72 disposed movably in a straight-line reciprocating motion along the optical axis direction with these guide shafts 14 and 8b, first bearing 7a, and second bearing 7b.

As shown in FIG. 6 to FIG. 8, attaching the guide shaft 14 to the base 8 is performed by holding both front and rear ends of the guide shaft 14 through use of a guide shaft support wall 91 and a guide shaft stopper member 9.

The guide shaft support wall 91 is integrally mounted on the base 8, for example, by die forming.

The guide shaft support wall 91 consists of two extended portions 91a stretching from spots facing ahead of the imaging device 116 to the front along the optical axis direction and tip portions 91b connected to the tips of the extended portions 91a, the tip portions 91b facing the base 8. Further, the two extended portions 91a are provided at two spots in a manner of holding the guide shaft 14 from its circumferential direction.

A recessed part 91c holding the front end of the guide shaft 14 is provided at the tip portions 91b, that is, the front end of the guide support wall 91. The recessed part 91 is formed of a columnar hole shaped with a bottom to which the tip of the guide shaft 14 is inserted. This hole having the bottom shape has an appearance of, for example, a letter D in section.

At a base 8's spot positioned at the rear end of the guide support wall 91, in other words, a front spot of the base 8 facing a direction in which the guide shaft 14 protrudes, there is provided a small diameter hole 8A, and a large diameter recessed part 8B is provided at the back surface of the base 8 on the same axis as that of the small diameter hole 8A. These small diameter hole 8A and large diameter recessed part 8B are formed on the same axis or substantially the same axis as the recessed part 91c.

The guide shaft stopper member 9 appears as a circular disk shape, having a small diameter shaft portion 9A, a large diameter shaft portion 9B on the same axis as the small diameter shaft portion 9A, and a fitting hole 9C provided on an end surface of the small diameter shaft portion 9B, and being on the same axis as these small diameter shaft portion 9A, large diameter shaft portion 9B, and the fitting hole 9c. It should be noted that in FIG. 10 and FIG. 11, the shape of the guide shaft stopper member 9 is depicted in a columnar shape of a uniform outside diameter to make clear the principal components of the present embodiment. The small diameter shaft portion 9A is formed in a diameter smaller than the small diameter hole 8A, while the large diameter shaft portion 9B is formed in a diameter smaller than the large diameter recessed part 8B. The fitting hole 9C is formed by a hole with a bottom in which the rear end of the guide shaft 14 is fitted. This hole having the bottom shape has an appearance of, for example, a letter D in section. It should be noted that the guide stopper member 9 may be formed in a shape other than a circular disk, and may be, for example, an elliptical plate shape, a polygonal plate shape and the like. Likewise, the shapes of the small diameter hole 8A and the large diameter recessed part 8B may be in shapes other than the circular shape.

If a projected part is provided in the guide stopper member 9 for engaging with an edge portion of the large diameter recessed part 8B from the front side of the base 8, it is advantageous in terms of assuring strength when an impact load is applied to the guide stopper member 9. In this case, the projected part would not be a hindrance when making positional adjustments of the guide stopper member 9 in a direction intersecting the optical axis at right angles.

The guide stopper member 9 is disposed such that the large diameter shaft portion 9B is stored in the large diameter recessed part 8B while the small diameter shaft portion 9A is stored in the small diameter hole 8A, and such that an abutting surface configured from a flat loop end surface that forms a border on the large diameter shaft portion 9B and the small diameter shaft portion 9A is abutted to an abutting surface configuring the bottom of the large diameter recessed part 8B.

As to the guide shaft 14, its front end is held by the recessed part 91c while its rear end is fitted on and affixed to the fitting hole 9C, the guide shaft stopper member 9 is moved in a direction intersecting at right angles to a direction of extension of the guide shaft 14. Accordingly, the positional adjustment is performed such that the optical axis of the lens 71 is parallel to the optical axis of the first group and the second group lenses.

The positional adjustment is carried out, for example, by using a commercially available X-Y table and the like.

After the positional adjustment, an adhesive S is applied to the large diameter recessed part 8B and the large diameter shaft portion 9B is affixed, thereby affixing the guide shaft stopper member to the base 8. In other words, while the small diameter shaft portion 9A is inserted through the small diameter hole 8A, with a gap being secured between the outer circumference surface of the small diameter shaft portion 9A and the inner circumference surface of the small diameter hole 8A, the one abutting surface is in abutment with the other abutting surface and affixed. As the adhesive S, for example, an UV hardening type adhesive may be used. In that case, a ultraviolet ray is irradiated to harden the adhesive S. It should be noted that a construction based on attaching the guide shaft 14 to the base 8 is not limited to the above-mentioned case and any arbitral method may be employed.

As shown in FIG. 6 and FIG. 9 to FIG. 12, the drive mechanism 15 moves the movable lens 72 in the optical axis direction, and includes a male screw member 1502 extending along the optical axis direction, a motor 1504 consisting of a stepping motor that rotates the male screw member 1502 and the like, a female screw member 1506 that screws into the male screw member 1502, an engagement section 7002 of the third group lens frame 7, and a coil spring 1508 (one example of the forcing member described in the Summary of the Invention).

As shown in FIG. 8 and FIG. 9, the motor 1504 is attached to a motor attachment member 1510, and the male screw member 1502 is connected to the motor 1504, extending in a direction parallel to the optical axis direction of the movable lens 72.

The motor attachment member 1510 includes a first piece 1510A, a second piece 1510B opposite to the first piece 1510A attached to an end surface of a motor 1504 case, and a third piece 1510C connecting these first piece 1510A and second piece 1510B.

On the first piece 1510A, there is provided a protruding part 1510D formed so as to protrude along a surface intersecting at right angles to an extending direction of the male screw member 1502. On this protruding part 1510D, there are formed a hole for screw insertion 1510E and a positioning hole 1510F. As shown in FIG. 8, while the positioning hole 1510F being engaged with a boss of the base 8, the motor attachment member 1510 is attached to the base 8 by screwing a screw 202 from the hole 1510E to a screw hole provided on the base 8. It should be noted that in the present embodiment, an engaging groove 1510E-1 is formed at a spot on the outside in a radial direction of the screw insertion hole 1510E, and that as the engaging groove 1510E-1 is engaged in an projected part provided on the base 8 side, the motor attachment member 1510 is so configured as not to oscillate about the hole 1510E in the center.

As shown in FIG. 9, the third piece 1510C extends from a base end of the first piece 1510A, while the second piece 1510B is provided at a tip of the third piece 1510A.

The tip of the male screw member 1502 (end in the front of the optical axis direction of the movable lens 72) is supported while allowing its revolving movement through a bearing hole and the like of the second piece 1510B.

Between the first and the second pieces 1510A and 1510B of the motor attachment member 1510, a rod 1512 for stopping revolution is attached so as to extend substantially parallel to the male screw member 1502 with a spacing in between.

The female screw member 1506 is engaged with the male screw member 1502, whereas the engaging recessed part 1506 of the female screw member 1506 engages with the rod 1512, thereby preventing the revolution of the female screw member 1506, so that the female screw member 1506 is constructed so as to make a reciprocating movement along the length direction of the male screw member 1502 by means of the forward and reverse revolutions of the male screw member 1502.

Further, as shown in FIG. 10 and FIG. 12, an end 1506A where the female screw member 1506 faces the rear of the optical axis direction of the movable lens 72 is provided abut-ably on the engagement section 7002 which forms part of an outer perimeter of the third group lens frame 7.

The male screw member 1502 includes, as shown in FIG. 9, FIG. 10, and FIG. 13, a male screw 1502A, which screws onto the female screw member 1506, and a shaft 1502B extending from an end of a male screw 1502A in a direction reverse to a direction of abutting the engagement section 7002 to the end 1506A of the female screw member 1506 on the same axis as the 1502A. In other words, the shaft 1502B extends from the end of the male screw 1502A in the rear of the optical axis direction of the movable lens 72 towards the rear of the optical axis direction.

The shaft 1502B is formed with an outside diameter d2 that is equal or less than an inner diameter d1 of the female screw included in the female screw member 1506. More specifically, the outer diameter of the shaft 1502B is formed of dimensions in which the female screw member 1506 can move smoothly in the length direction of the shaft 1502B without the female screw member 1506 getting loose in the radial direction of the shaft 1502B, while the female screw member 1506 being positioned on the shaft 1502B.

Alternatively, a small diameter portion may be formed on the end of the male screw 1502A whereas attaching a slide bearing to this small diameter portion, thereby configuring the shaft 1502B with the slide bearing.

Further, as shown in FIG. 10 and FIG. 11, the female screw member 1506 is disposed so as to be able to move along the male screw member 1502 from the male screw 1502A of the male screw member 1502 to a spot 1502C of the shaft 1502B adjacent to the male screw 1502A.

More specifically, the female screw member 1506, when the male screw member 1502 performs the forward and reverse revolutions, moves in a straight line along the male screw member 1502A if it is engaged with the male screw member 1502A.

Further, when it moves along the male screw member 1502 from the male screw 1502A of the male screw member 1502 to the spot 1502C side of the shaft 1502B by the forward and reverse revolutions of the male screw member 1502, as shown in FIG. 13, the female screw member 1506 is so disposed that it comes off the male screw 1502A and positioned on the spot 1502C of the shaft 1502B.

A coil spring 1508 is disposed so as to wind around the guide shaft 14, with its one end being elastically in abutment with the first shaft 7a of the third group lens frame 7 and the other end being elastically in abutment with the base 8 side, thereby making the engagement section 7002 to force the third group lens frame 7 in a direction abutting the end 1506A of the female screw member 1506. In other words, the coil spring 1508 forces the third group lens frame 7 to the front of the optical axis direction, thereby making the third group lens frame 7 in abutment with the female screw member 1506 at all times. Accordingly, the third group lens frame 7 or the movable lens 72 makes a straight reciprocating movement in the optical axis direction following the movement of the female screw member 1506.

Further, an opening is formed at a base 8 spot positioned on the optical axis of the movable lens 72, a storage recessed part 8c on the back surface of the base 8 facing the opening is provided, and the imaging device 116 is stored and held in the storage recessed part 8c.

Further, at a spot facing the base 8 of the third group lens frame 7, a detecting piece 73 protrudes towards the rear of the optical axis direction, and at a base 8 spot facing the detecting piece 73, there is disposed a sensor 18 including a photo interrupter. This sensor 18 is used to set a reference position (starting point) of the movable lens 72, and the starting point of the movable lens 72 is set as follows.

When, through the revolution of the motor 1504, the movable lens 72 moves in the optical axis direction and the detecting piece 73 is detected by the sensor 18, the revolving position of the motor 1504 when that detection is made is set as the reference position (starting point) for performing a positional control of the optical axis direction. Furthermore, as the amount of revolution of the motor 1504 is controlled by using the reference position as a reference, the amount of movement (movement position) of the movable lens 72 in the optical direction is controlled. For example, if the motor 1504 is a stepping motor, by controlling the number of pulses of a drive signal to be supplied to the stepping motor by using the reference position as the reference, a movement control (positional control) of the movable lens 72 is carried out.

Such setting of the reference position is carried out, for example, when a power of the image pickup apparatus 100 is turned on, or when the image pickup apparatus 100 is set for a photo-shooting mode.

It should be noted that in the present embodiment, a lens barrel of the present invention includes the lens barrel 2, the movable lens 72, the guide mechanism 17, and the drive mechanism 15.

Next, operations of the movable lens 72 and the drive mechanism 15 will be described.

In order to move the lens barrel 1 moves from a storage position (collapsible barrel position) to a use position, first, the gear unit is driven to drive the cam ring 4, whereby the first group lens frame 2 and the second group lens frame 3 are moved to the front of the optical axis direction.

At this point, if the movable lens 72 moves to the front of the optical axis direction in response to the forward revolution of the motor 1504, and if it moves to the rear of the optical axis direction in response to the reverse revolution, as shown in FIG. 11 to FIG. 10, when the motor 1504 makes forward revolution, the female screw member 1500 is being forced by the coil spring 1508 to the front of the optical axis direction through the engagement section 7002, and in response to the forward revolution of the male screw member 1502, the female screw of the female screw member 1506 screws from over the spot 1502C of the shaft 1502B to the male screw 1502A. Accordingly, the movable lens 72 is moved to the front of the optical axis direction, and in response to the forward and reverse revolutions of the motor 1504, the female screw member 1506 is subjected to the straight reciprocating movement on the male screw 1502A in the optical axis direction, whereby the movable lens 72 performs the focusing operation.

Next, in order to move the lens barrel from the use position to the storage position (collapsible barrel position) where the lens barrel is stored in the front of the case 102, first, as shown in FIG. 10 to FIG. 11, the female screw member 1506 is moved to the rear of the optical axis direction by the reverse revolution of the motor 1504, and moved from the male screw 1502A towards the shaft 1502B. Furthermore, as shown in FIG. 13, the female screw of the female screw member 1506 comes off the male screw 1502A, and the female screw member 1506 is positioned on the spot 1502C of the shaft 1502B.

When the female member 1506 is positioned on the spot 1502C of the shaft 1502B, the female screw of the female screw member 1506 comes off from the male screw 1502A, and even if the motor 1504 is kept revolving in the reverse direction, the female screw member 1506 is prevented from moving in the optical axis direction. On the other hand, since the female screw member 1506 is being forced by the coil spring 1508 to the front of the optical axis direction through the engagement section 7002, the female screw member 1506 remains on the spot 1502C of the shaft 1502B. More specifically, when an upper end spot of the female screw of the female screw member 1506 is in abutment with a lower end spot of the male screw of the male screw member 1502A, the female screw member 1506 remains on the spot 1502C of the shaft 1502B.

In other words, because the movable lens 72 makes the straight reciprocating movement in the optical axis direction by the coil spring 1508, the engagement section 7002, the female screw member 1506, and the male screw member 1502 while the female screw member 1506 being positioned on the spot 1502C of the shaft 1502B which is adjacent to the male screw 1502A, the movable lens 72 is prevented from moving any further to the rear of the optical axis direction. Accordingly, while the female screw member 1506 is being positioned on the spot 1502C of the shaft 1502B, the rear limit position of the movable lens 72 is a position such that the movable lens 72 cannot move any further to the rear of the optical axis direction.

When the motor 1504 is in the reverse revolution for an amount more than it is necessary to enable the movable lens 72 to reach the rear limit position, the reverse revolution of the motor 1504 is stopped. Furthermore, as mentioned above, the gear unit is driven to drive the cam ring 4, and the first group lens frame 2 and the second group lens frame 3 move to the rear of the optical axis direction, and the lens barrel 1 is in the collapsible barrel mode.

According to the present embodiment, the rear limit position of the movable lens 72 is a position such that the female screw member 1506 is placed on the spot 1502C of the shaft 1502B and unable to move any further to the rear. Accordingly, contrary to a case of determining the rear limit position by the use of the sensor 72, there is no or almost no variance of accuracy when attaching a sensor to the lens barrel portion and variance of accuracy of a stop position of the movable lens 72 due to changes in the speed of revolution of the motor.

As a result, a gap between the movable lens 72 and the lens barrel portion (base 8) which is positioned in the rear of the movable lens 72, and a gap between the movable lens 72 and the other lens groups (the second group lens frame 2 and the lens held thereby) positioned in the front of the movable lens 72 may be reduced in accordance with an amount of the variance mentioned above. This makes it advantageous in making dimensions of the lens barrel smaller in the collapsible barrel mode of the lens barrel in the optical axis direction.

Further, regardless of the speed of revolution and changes in speed and the like of the motor 1504, there is no or almost no variance of the rear limit position of the movable lens 72. As a result, for example, when recessing the barrel of the lens barrel 1, it is possible to run the motor 1504 at high speed and move the movable lens 72 at high speed to the rear limit position. This makes it advantageous in shortening time required for barrel-recessing operation of the lens barrel 1.

It should be pointed out that, although in the present embodiment, the description is made for a case applying the present invention to the third group lens frame 7, the present invention may be applicable to the first groups lens frame 2 and the second group lens frame 3.

Further, in the present embodiment, the description has been made for a case of applying the present invention to the rear limit position of the movable lens 72. Alternatively, the present invention may also be applicable to the front limit position which is ahead of the optical axis direction.

Still further, in the present embodiment, a digital still camera is used as an image pickup apparatus. Alternatively, the present invention may also be applicable to a video camera, and other varieties of image pickup apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. A lens barrel comprising:
   a barrel element;
   an image-capturing optical system disposed inside the barrel element; wherein
   the image-capturing optical system includes a movable lens disposed movably in an optical axis direction thereof, and a drive mechanism for moving the movable lens in the optical axis direction;
   the movable lens includes a lens and a lens frame holding the lens;
   the drive mechanism includes
   a male screw member extending along the optical axis direction,
   a motor revolving the male screw member,
   a female screw member being engaged with the male screw member and moving along the male screw member in response to the revolution of the male screw member,
   an engagement section provided on the lens frame and facing an end along the optical axis direction of the female screw member, and
   a forcing member for forcing the lens frame in a direction abutting the engagement section to the end of the female screw member;
   the male screw member includes
   a male screw engaging with the female screw, and
   a shaft having an outside diameter equal or less than an inside diameter of a female screw being included in the female screw member, the shaft extending on a same shaft of the male screw from an end of the male screw that is positioned at an opposite direction to a direction in which the engagement section is in abutment with the end of the female screw member; and the female screw member is disposed to move along the male screw of the male screw member, wherein the female screw member can move along the male screw to a spot on the shaft in abutment with the male screw whereat the female screw is no longer engaged with the male screw and the female screw member is prevented from moving past said spot on the shaft in the direction opposite the direction abutting the engagement section even if the male screw member continues to revolve.

2. The lens barrel according to claim 1, further comprising:

a sensor detecting an amount of movement or a reference position that serves as a reference of position when the lens frame moves along the optical axis direction.

3. The lens barrel according to claim 1, wherein:

the direction abutting the engagement section to the end of the female screw member is a direction to a front side at which an object to be imaged is located along the optical axis direction of the image-capturing optical system.

4. The lens barrel according to claim 1, wherein:

the shaft extends from a rear end positioned in a back side of the male screw opposite of a front side at which an object to be imaged is located along the optical axis direction of the image-capturing optical system.

5. The lens barrel according to claim 1, further comprising:

an imaging device for capturing an object image formed in the image-capturing optical system, the imaging device being provided in a back side of the lens frame;

wherein the shaft extends from a rear end positioned in a back side of the male screw opposite of a front side at which an object to be imaged is located along the optical axis direction of the image-capturing optical system.

6. The lens barrel according to claim 1, further comprising:

a sensor detecting an amount of movement or a reference position that serves as a reference of position when the lens frame moves along the optical axis direction; and an imaging device for capturing an object image formed in the image-capturing optical system, the imaging device being provided in a back side of the lens frame;

wherein the shaft extends from a rear end positioned in a back side of the male screw opposite of a front side at which an object to be imaged is located along the optical axis direction of the image-capturing optical system.

7. The lens barrel according to claim 1, further comprising:

a guide mechanism disposed in the barrel element for guiding the movable lens in the optical axis direction; wherein the guiding mechanism includes a guide shaft disposed along the optical axis direction, the guide shaft guiding the movable lens in the optical axis direction by engaging with a bearing section of the lens frame;

the forcing member includes a coil spring; and the coil spring is disposed so as to wind around the guide shaft, with one end thereof being elastically in abutment with the bearing section and the other end being elastically in abutment with a side of the barrel element.

8. An image pickup apparatus including a lens barrel, comprising an image-capturing optical system disposed inside the lens barrel; wherein the image-capturing optical system includes a movable lens disposed movably in an optical axis direction thereof, and a drive mechanism for moving the movable lens in the optical axis direction;

the movable lens includes a lens and a lens frame holding the lens;

the drive mechanism includes a male screw member extending along the optical axis direction, a motor revolving the male screw member, a female screw member being engaged with the male screw member and moving along the male screw member in response to the revolution of the male screw member, an engagement section provided on the lens frame so as to face an end along the optical axis direction of the female screw member, and a forcing member to force the lens frame in a direction abutting the engagement section to the end of the female screw member;

the male screw member includes a male screw engaged with the female screw member, and a shaft having an outside diameter equal or less than an inside diameter of a female threaded element included in the female screw member, the shaft extending on a same shaft of the male screw from an end of the male screw, the end being positioned at an opposite direction to a direction in which the engagement section is in abutment with the end of the female screw member; and the female screw member is disposed such that the female screw member can move along the male screw of the male screw member and that the female screw member can move from the male screw to a spot on the shaft in abutment with the male screw whereat the female screw is no longer engaged with the male screw and the female screw member is prevented from moving past said spot on the shaft in the direction opposite the direction abutting the engagement section even if the male screw member continues to revolve.

* * * * *